Nov. 12, 1946.  W. HEGENER  2,410,879
ANIMAL CAGE
Filed Jan. 1, 1945
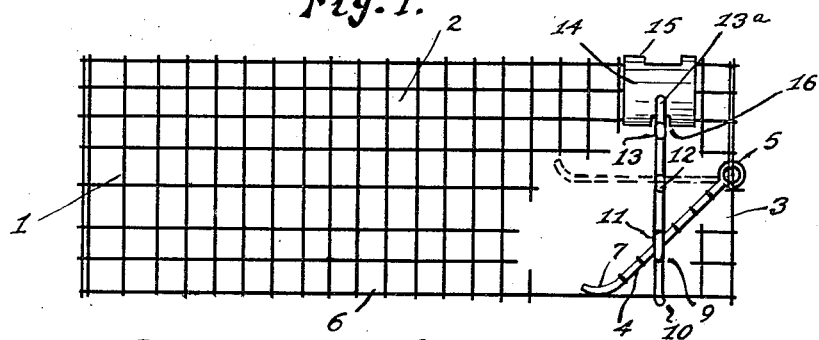
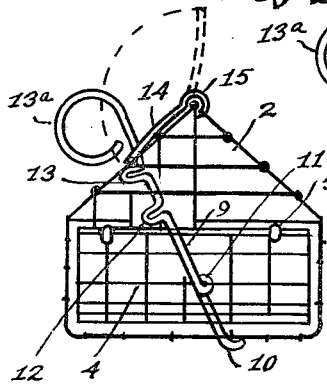
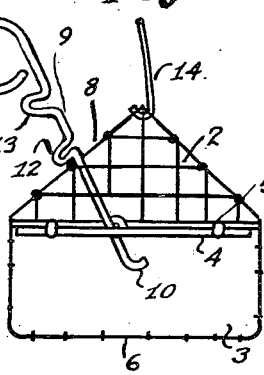
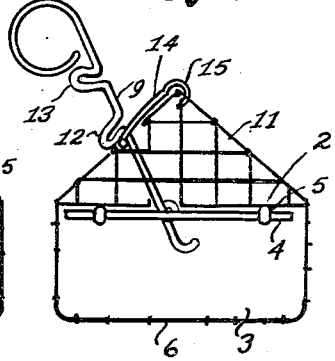
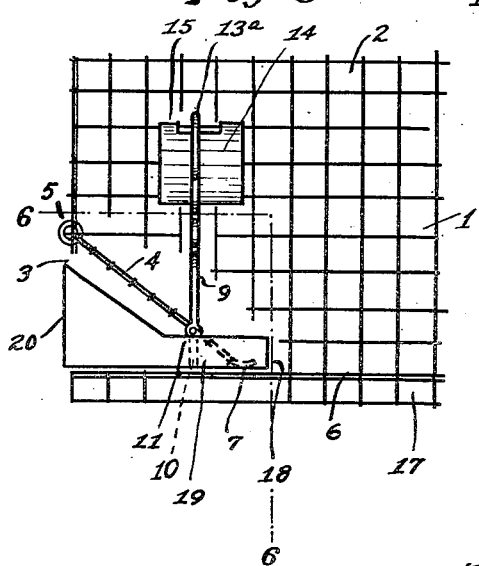
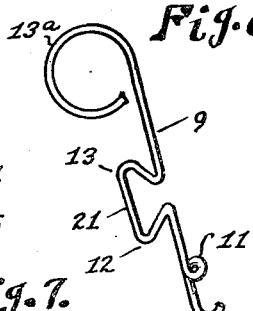
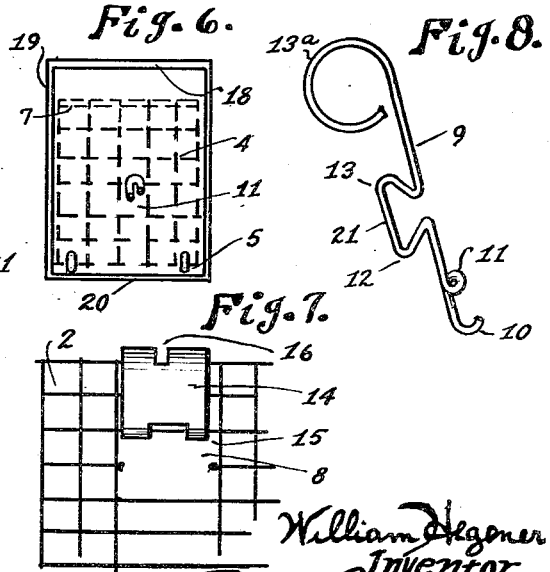

Patented Nov. 12, 1946

2,410,879

UNITED STATES PATENT OFFICE 2,410,879

ANIMAL CAGE

William Hegener, Sarasota, Fla.

Application January 1, 1945, Serial No. 570,827

11 Claims. (Cl. 119—17)

This invention relates to animal cages chiefly for the smaller species of animals such as rodents, though not confined thereto, and particularly for such animals used by experts in pathological research and examination of animals for evidences of disease, especially of rare and unusual infectious diseases, to hold and store the animals while awaiting their turn, or to watch them in the development of conditions detected or suspected; and also used to convey them to other research centres for additional scrutiny.

The primary object of my present invention is to provide such a cage into which an animal may be transferred, which has been captured in a live-catching trap such as decribed in companion application for patent filed the same day as this application, by Gilbert S. Warner, assignor to William Hegener; it being my purpose by the invention described and claimed in this application hereinafter to, first, render it easy to make the transfer from trap to cage with safety to the life and health and nerves of the captive animal, without handling, with precautions against escape either during the transfer or afterward. Further equally important objects are to provide a simple, easily constructed means for manipulating and holding the gate of the cage to help govern access and ingress thereto and egress therefrom, for doubly locking the gate against unintended freeing of the animal by inadvertence or accident, and providing also against chance overturn of the cage shaking loose the locking means; in addition providing means for clamping the locking devices for this purpose and for transportation of the cage to a distance.

It is moreover one of the principal objects of my invention to facilitate the maintenance and feeding of the animal in the cage, experience having shown myself and my associates that there are certain individual and idiosyncratic habits or a variety of habits, traits and sensitivities of practically all wild animals of the rodent type, which present problems of nourishment and indeed of survival, difficult to meet without special provisions based upon the physical, infra-psychological or behavior characteristics encountered, notably the proneness of this type of animals to expire in the storage cage from fright or shock; and my invention embodies features especially devised to afford easy and effective supply of suitable food and drink to these animals.

With these and other objects in view, my invention consists in certain novel and effective devices and construction of the cage and its appurtenances and mechanism as are hereinafter fully described and shown, to effectually carry out the purposes of the invention hereinabove outlined.

In the accompanying drawing forming part of this specification, in which like letters of reference designate like parts in the several views:

Figure 1 is a longitudinal side elevation of an animal cage embodying my invention, with portion of one side broken away near the front, the better to show the construction.

Figure 2 is a front elevation thereof.

Figure 3 is a similar front elevation, with the gate lifted and the cover of the food opening raised.

Figure 4 is a similar view with the clamp for locking the operating lever, pressed down in place. In this figure and in Figure 3 the lower part of the cage is shown in outline, and the hinged upper edge of the gate is shown in simple parallel lines instead of full network, both for clarity.

Figure 5 is a slightly enlarged side elevation, partly broken away, of a modified form of the cage, the entrance and gate being placed at the left of the cage, instead of at the right, as in the other figures, which position is optional.

Figure 6 is a detail of the feeding trough forming part of the invention as shown in Figure 5, being a section taken on the line 6—6 of Fig. 5, with all of the walls of the cage removed for clarity.

Figure 7 is a detail of the cage showing the food-opening in its roof, with the clamp raised above it.

Figure 8 is a detail of a modified form of operating lever forming a main part of the invention.

In the practice of my invention, I construct a cage 1, of a usual body, rectangular in form, made of wire netting of sufficiently strong material and any desired mesh, with slanting or hip roof 2, preferably slanted on both sides, though the cage may be made in any shape suitable to its purpose, which is generally that of a transfer or storage cage, to which the animal is removed from the trap in which it has been caught previously. The cage is formed with an opening 3, in front, either at one side of said front, or extending wholly across the front end of the cage, as shown in Figures 2, 3 and 4. At the top of this opening is hinged a gate 4, which I make of the same wire netting, but which may be solid and of any material desired. The hinges 5 may be no more than simple wire loops. The gate is deeper than the height necessary to close the opening 3, swings inwardly only, and projects diagonally into the cage, as best shown in Figure 1, where it is drawn in heavy lines to show it in more distinctive outline against the rest of the mechanism. Its lower edge rests upon the floor 6 of the cage, which is of the same netting as its walls, and this lower inner edge of the gate is upturned in the form of a flange or extension 7, first flattened to rest on said floor 6 as a closure, and then forwardly bent or curved just enough to clear the floor easily, and not catch in it even when clamped down hard, as it may be by its locking mechanism hereafter described.

In one side of the roof 2, near the front end of the cage which carries the gate, I make a small food-supply opening 8, at the apex of the roof at one side, usually made by cutting just one bar of a mesh-square of the netting, which will leave an opening as large as two mesh-squares. In this opening 8 I mount the operating lever 9, which I form from a piece of stiff, stout wire or rod pliable by instruments or tools, but retentive of shape and substantial rigidity after being made, and which may alternatively be cast or otherwise manufactured. It is of a length to extend on either a vertical or slanting line, from the portion of the hip-roof where it is inserted, to the floor of the cage, preferably slanting or diagonally as shown, for the proper or more effective locking for which it is in chief part intended. At the lower end of this lever is formed an integral hook or up-bend of the wire, 10, which is adapted to hook into the wire mesh of the floor of the cage, as shown in Figures 1 and 2. Further up, this lever is provided with a loop 11, which is wound around part of the wire mesh of the gate 4 at a point calculated to give good leverage for slight lift of the gate by the lever, and also at such a point in its slanting position that it will leave the hook 10 engageable with the floor at the moment that the lever so hooked will press down on the gate tightly, and the hook so caught in the floor will retain said gate securely. Further up still, the lever is formed or provided with a hook-shaped locking shoulder 12, shown in Figures 2, 3 and 4 as made by bending the wire or rod outwardly in a slight fold upon itself, with a downward inclination, and at such a point upon the rod or lever that when the gate is lifted to a horizontal position, the hook or locking shoulder 12 will catch over the wire mesh of the hip-roof, and hold said door open. At a slighter predetermined distance up, the lever or wire is again bent upon itself to form an almost identical hook or locking-shoulder 13, but this one is curved upwardly instead of downwardly, being designed to catch under the wire, whereas the first shoulder 12 is designed to catch over the wire, of the roof. The hook 13 locks the gate down against the floor, the same as the lowest hook 10 does, but with a more forcing and tightening pressure than the hook 10 can, since the latter must have at least enough play to permit it to be engaged into the floor as the gate is simultaneously lowered, but the upper hook 13 is engaged with the roof after the gate is caught down initially, and it is easier to press down on the gate enough to hook in the upper hook 13 thereafter.

The remaining portion of the wire or rod making the operating locking-lever 9 is turned into a loop or handle 13ª, in which the finger may be inserted, or which may be grasped by two or more fingers externally. This handle is used to perform all the manipulations of the lever, holding or lifting, dropping or locking, and when the lever is finally locked with the hook 10 in, and with the hook 13 in, the handle lies secured free from possible movement, until the hooks are purposely disengaged. Above the food-supply opening 8 in the hip roof, wherein this lever is inserted, I hinge upon the ridge of the roof a clamping cover 14, which I make of a curved, nearly flat plate of metal with its upper edge turned into a hinge 15, the lower edge of the plate being centrally formed with a notch 16, which when the cover is down, engages the shank of the lever 9 just above the hook-shoulder 13, and frictionally holds down the cover thereby, while at the same time it provides a third locking means, or clamping means for clamping down the lever, the hook 13, the gate 4, and the hook 10 correspondingly. In the form of my invention so far shown, any provision may be made for feeding the animal through dropping food into the opening 8 in the roof, or a tray may be slipped into the cage through the opening 3 in front of the cage, or the special device shown in Figure 5 may be employed.

In this Figure 5 I have shown a modified form of my invention, in which this special tray is inserted and also is locked in by the operating lever. This view, as stated, shows a portion of a cage, drawn somewhat larger, in which the operating lever is placed upon the left hand of the cage at one end, instead of at the right, as the other figures show, which of course is optional; the opening may be at either end of the cage, may extend wholly across the end thereof, or merely at the right side or left side of said cage, or in the centre. I have in this form, shown the cage mounted upon longitudinal runners 17, made of the same material as the cage or otherwise as desired, holding up the floor 6 above the surface on which the cage rests. In the opening 3 I place a tray or feed-trough 18, shown in detail plan in Figure 6 and in side elevation in Figure 5. It is a rectangular pan with its rim-flange 19 extended upwardly on a diagonal line to form a raised front wall 20, which runs up as high as the opening 3, or nearly so, with just enough margin to clear under the gate 4. The tray must be long enough to receive the gate and its inner end or flange 7, and is slidable upon the floor 6 of the cage, which floor may be left of the same wire netting, or may be lined or replaced by sheet metal. The operating lever 9 and its appurtenant parts are the same as in the other figures, except that I may optionally but not necessarily leave off the lower hook 10, and as before, cause the lever 9 to bear down on the gate with its flange pressing on the tray 18. This equally permits the locking-shoulder 13 to lock the gate down, and also the cover-clamp 14 to clamp down upon said lever at said hook 13, which likewise locks and clamps the tray at the same time as it locks and clamps the gate, whether omitting or leaving on the lower hook 10. In this Figure 5, the clamping-cover 14 is hinged below the ridge of the roof instead of directly upon said ridge. In Figure 8 I show a modified form of operating lever having the same parts, but shaped and bent outwardly in a loop 21, forming the hooks 12 and 13 the same as before and likewise, reversely curved.

The operation of the invention will readily be understood from the foregoing description taken in conjunction with the drawing, and with a brief explanation thereof. The animal having been caught in a trap such as described and shown in companion application for patent filed the same day as this one by Gilbert S. Warner, assignor to William Hegener, in which the animal is trapped alive, and which employs a sliding drop-door, or having been caught in any other live-catching trap of similar class or kind, the cage embodying the present invention is placed end to end with the aforesaid trap containing the captured animal, with the trap-door of the one and the gate of this cage in juxtaposition, whereupon the drop-door of the trap is lifted, and the operating lever 9 of this cage is employed to lift the gate 4. This is done by releasing the said lever from its locks and clamp by first raising the clamp-cover 14 to the vertical position shown in Figure 3, and indicated in dotted lines in Figure 2, then seizing the handle of the lever 9, detaching the upper hook 13 from the roof of the cage, pulling up the gate 4, and in the same movement detaching the lower hook 10, if the form including said hook is employed, and then the middle hook-shoulder 12 is engaged on top of the roof, all as shown in Figure 3, thus locking the gate 4 in horizontal position. The animal is then mildly urged from the trap into the cage, usually by blowing a light wind pressure against the rear of the trap, until it leaves the trap and enters the open gate of the cage. When it so enters, and preferably before the trap is taken away, the operating lever is again handled by the finger or fingers of the operator to, first, disengage the hook 12 thereof from the cage-roof, second, lower the gate, and in so doing, third, engage the lower hook 10 in the floor of the cage if said hood is used (as in Figures 1 to 4 inclusive), this being done of course by a twist of the handle with the fingers, fourth, engage the upper hook 13 under the roof of the cage, and fifth, bring down the cover-clamp 14 to force its notch 16 into frictional contact with the shank of the lever just above the hook 13, to clamp down on the same. Thus, besides the fact that the gate 4 is an automatic guard, against escape, being higher than the opening, and swung diagonally inward, there will be, in this form, three locks upon the gate protecting against accidental release or escape of the animal, i. e., the hook 10 in the floor, the hook 13 in the roof, and the clamp 14 upon that. In the case of the modified form of Figure 5, there will be two locks, or locking effects, in case the lower hook 10 is eliminated.

Coming to the matter of feeding, this is best explained by reference to said Figure 5, which embodies my preferred form of supplying food and drink to the captive. The tray or feed-trough 18 is insertible and removable in and through the opening 3, and is slidable therein. It may be adjusted slightly inward and, as shown, slightly outward. If made with a tray much longer than illustrated, it can be pushed outwardly much further, since the length of the tray beyond the impact point of the flange 7 of the gate 4, is the only limit to outward movement. There is so little of limit to inward movement that in some specimens of my cage I bend up the floor to make a stop, and any suitable limit of movement may be imposed in any known and obvious way, the same forming no part of the novel features of my invention. In whatever adjustment the tray is set, it is held in that position by the impact thereon of the gate-flange 7, under the pressure thereupon by the locking lever 9. The food being placed in the front raised portion of the feed-tray 18, is pushed backward into the inner portion of said tray as needed, the gate being lifted to permit this, and then locked down. In this way, a supply of food is always available, and can be changed from storage food in front of the gate, to supplied food inside the gate, accessible to the animal, for immediate consumption. In providing drink, water may be placed in the tray, at the rear, and let run into the inner portion of the tray in a shallow level, which the captive may lick up from said tray inside the gate, or may push his tongue through the gate mesh-apertures to do so, such being one of the habits of rodents, while other habits of theirs such as spilling or befouling the water where a quantity of it is accessible to them in the cage, is measurably inhibited by the smallness of the quantity of water allowed them by the use of this tray with its shallow level of fluid.

The cage may be used without employing the special form of tray shown in Figure 5, or without placing any tray whatever in the cage, especially if the animal is to be kept there for but a short time, during which the simplest of feeding and drinking expedients will temporarily serve its essential requirements. Even for a substantial time the animal is fully fed and nourished by dropping pieces of biscuit or peanuts or other edibles through the food-supply opening, and I also soak pieces or strips of sweet potato in water and drop them in the opening, which answers the need of drink. When I use the tray, it is not necessary to eliminate the hook 10, as is shown in Figure 5, for this hook projects below the gate 4, and in front of it, and there is quite enough play in the lever 9 in its loose mounting in the food-supply opening 8, to let this hook 10 fit in the tray in front of or outside the gate. This hook 10 is a valuable adjunct to the locking; if there is to be transportation, it is especially invaluable.

The trays permit of measured quantities of foods, and of special foods, being given on each feeding, with such variation as is intentional; also uniform quantities of each food to each animal of a kind, with any needed additions for special feedings. They also allow special feeding in research as to effects of various vitamins, to different animals and groups. While food may be placed directly in the tray, it may also be dropped in through the opening 8 in the roof the same as described before; in this case, it will fall in the tray, accessible to the captive immediately, unless otherwise arranged, and it may be allowed to drop on the cage-floor, if there be reason for so doing. The locking of the gate upon the tray to hold it in place, is effective equally if the hook 10 be left on or if it be omitted.

With the use of the modified form of lever shown in Figure 8, the operation of the cage is the same as hitherto described; this form of lever is more easily made, more easily kept in its shape, and more easily caught in place, since while the two hooks 12 and 13 still operate as before stated, there is a certain amount of spring in them and between them in this form, as the two hooks may move slightly together, yet spring back, and the hooks may be brought closer together or further apart by bending the wire to adjust tightness, or looseness of the pair, relatively.

In other respects, such as sanitation, it is my practice to place all the storage cages upon a trough, or table or other receptive surface or expedient, and all foreign matter from the cages and the occupant thereof, may drop into such trough or other receptacle, leaving the cage comparatively clean when removed for transportation, or for examination of the captive animal. Any such convenient practice forms in itself no part of my present invention, and therefore I have not found it necessary to show such provisions, more or less familiar to workers in this art or research.

My invention is not confined to the exact details herein described and shown, but various modifications may be made within the spirit and purview of my broadly new invention. I may employ the invention in connection with various forms and sorts of cages designed either for general or especial use.

What I claim as new and desire to secure by Letters Patent is:

1. An animal cage provided with a swinging hinged gate and a combined lifting and locking lever connected to said gate, to lift the same for ingress and egress of the animal therefrom, said lever projecting upwardly from the gate to a point outside the cage near the roof, and provided with a locking device thereon by which it may be hooked into a part of the cage, to press down upon the gate and hold it tightly against opening, and with a second locking device by which it alternatively may be hooked into the cage-body to hold said gate lifted and open.

2. An animal cage provided with a gate, and a lever mounted in said cage, and connected with said gate to lift it, and bearing against said gate to keep it closed, and said lever being provided with hooks thereon adapted each to be alternatively engaged in the cage-body, one to hold the gate locked open when lifted, and the other to hold the gate locked tight when shut, the said hooks being oppositely directed, and resting, while set, one under the part of the cage-body engaged, and the other over the part of the cage-body engaged.

3. An animal cage provided with a gate, and a combined lifting and locking lever formed of a single wire or rod connected to the gate at one end, and provided with oppositely directed hooks at different distances from the end of said lever, the lower hook being adapted to fit over a part of the cage-body into which it is engaged, and the upper one to fit under a part of said cage-body, to hold the gate open by the action of the lower hook, or to hold it shut by the upper hook, and the upper portion of the wire or rod being provided with a handle lying outside the cage-body at a height above both said hooks.

4. An animal cage provided with a gate, and a combined lifting and locking lever connected to said gate to lift it, provided with two hooks centrally of its ends, one adapted to fit into the cage-body to lock the gate open in a substantially horizontal position, and the other to fit into said body at a different point upon said lever, to lock said gate shut, and a clamp upon the outside of the cage mounted to be moved down upon the lever at the point of the last-mentioned hook, to be clamped thereon as an additional security thereto.

5. An animal cage provided with a gate swinging inwardly to lie upon the floor of the cage, and a combined lifting and locking lever connected to said gate, and provided with three hooks thereon at different heights, one at its lower end to be hooked into the floor of the cage as the gate is dropped shut by said lever, the second adapted to be hooked into the cage-body to hold the gate when open, and the third adapted to be hooked into said cage-body when the gate is shut and the lowest hook caught in the floor, giving the gate a double locking shut, and a single locking open.

6. An animal cage provided with a gate, a combined lifting and locking lever connected thereto, means upon said lever for hooking it into the cage-body to lock the gate open when lifted, and shut when lowered, by said lever, and a clamping-plate upon the outside of the cage, movable down upon the shut-gate-locking means to clamp the lever additionally.

7. An animal cage provided with an entrance opening in one end, a gate closing the same against egress of a captive animal in said cage, and the said cage being also provided with a smaller food-supply opening in the cage-body at the upper portion thereof, a combined lifting and locking lever connected to the gate to lift and lower the same, and provided with means for hooking said lever into the cage-body to lock said gate either in its lifted or its lowered position, the said lever being arranged in and operating through said food-supply opening, and a clamp-cover plate movably mounted next said food-supply opening to be closed upon the same and simultaneously moved down upon the lever as an additional locking means therefor, and to lock the plate over the food-supply opening.

8. An animal cage provided with an entrance opening in one end of the same, a feed-tray adapted to be inserted in said opening upon the floor of the cage, a swinging gate extending into said opening, and resting upon said floor when the tray is out, and resting upon said tray when it is in place upon said floor in the opening, and a combined lifting and locking lever connected to said gate to lift and lower the same, and adapted when pressed down to hold the gate tightly against the floor when the tray is out and tightly against the tray when said tray is in position and thus hold both said tray and said gate in mutual frictional contact, and means upon said lever to lock said gate shut down upon said floor or tray.

9. An animal cage provided with an entrance opening in one end of the same, and a gate closing the same, against egress of a captive animal therein, a combined lifting and locking lever connected to said gate to lift and lower the same, the said cage being also provided with a food-supply opening separate from its entrance opening, and a cover-plate for said food-supply opening movable over said opening to close the same, and formed and adapted to clamp down upon said lifting and locking lever, at the same time.

10. An animal cage provided with a gate, a lifting and locking lever connected therewith, a tray slidably and removably mounted in said cage upon the floor thereof, under the gate, and means upon the lever for holding shut and locking said gate down upon said tray to frictionally engage the same, and lock both gate and tray simultaneously.

11. An animal cage provided with an entrance opening in one end of the same and a food-supply opening in the upper portion of said cage, a gate hinged in said entrance, adapted to swing inwardly, and higher than the opening and adapted to lie upon the floor of the cage while positioned in a diagonal direction with respect to the floor and end wall, and formed with a flanged inner end, a feed-tray slidably and removably mounted in the entrance under said gate, and formed with a rim or flange around the same, raised at the front, adapted to hold a supply of food in the outer portion of said tray, which may be pushed into the inner portion of said tray within the interior confines of the cage, a combined lifting and locking lever mounted approximately vertically in the cage, in the food-supply opening, and connected to the gate to lift and lower the same, and formed of a single piece of wire or rod shaped to form two reversely-directed hooked shoulder-portions which at varying heights of the lever, respectively catch in the cage-body, one of them to hold the gate open in a substantially horizontal position, and the other to lock the gate shut down upon the tray to frictionally hold the gate and tray down upon the floor beneath, said lever being provided with a handle at top, and a clamp-cover plate hinged above the food-supply opening and adapted to be clamped down upon the locking hook of the lever, and notched to permit the shank of said lever to be engaged thereby.

WILLIAM HEGENER.